(12) United States Patent
Goldstein

(10) Patent No.: US 6,504,954 B1
(45) Date of Patent: Jan. 7, 2003

(54) CLOSED LOOP PIECEWISE-LINEAR HISTOGRAM SPECIFICATION METHOD AND APPARATUS

(75) Inventor: Adam A. Goldstein, Santa Clara, CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/245,444

(22) Filed: Feb. 5, 1999

(51) Int. Cl.[7] .............................................. G06K 9/00
(52) U.S. Cl. ........................ 382/168; 382/274; 348/672
(58) Field of Search .............................. 382/168, 169, 382/170, 171, 172, 173, 274, 275, 167, 164; 358/448, 461, 455, 453, 466; 348/672, 678, 687, 674, 241; 345/596, 690–697

(56) References Cited

U.S. PATENT DOCUMENTS

| | | | |
|---|---|---|---|
| 4,353,092 A | * 10/1982 | Bailey et al. | ................. 348/672 |
| 4,573,035 A | * 2/1986 | Dolazza | ....................... 348/241 |
| 5,063,607 A | * 11/1991 | FitzHenry et al. | ........... 348/672 |
| 5,339,368 A | * 8/1994 | Higgins-Luthman et al. | ........................... 382/169 |
| 5,490,222 A | * 2/1996 | Sugimoto | .................... 382/168 |
| 5,982,926 A | * 11/1999 | Kuo et al. | ................... 382/169 |
| 6,061,091 A | * 5/2000 | Van De Poel et al. | ...... 382/170 |
| 6,236,751 B1 | * 5/2001 | Farrell | .......................... 382/168 |

* cited by examiner

Primary Examiner—Jingge Wu
(74) Attorney, Agent, or Firm—Leonard A. Alkov; Glenn H. Lenzen, Jr.

(57) ABSTRACT

Systems and methods that compute and apply a real-time transformation between digital input and output signals to achieve a specified output histogram. The systems and methods implement a predetermined (piecewise-linear) transfer function, coarse output histogram collection, and a closed-loop algorithm to produce a target (or specified) coarse histogram. Compact low-power systems contain a controller to implement the closed-loop algorithm, and a signal processor to implement the transfer function and coarse histogram collection. The use of a piecewise-linear transfer function in conjunction with coarse histogram collection, where the number of bins collected is equal to the number of piecewise-linear segments, results in a significant reduction in computational load and communication bandwidth required by the systems and methods.

10 Claims, 5 Drawing Sheets

$y(n,k) = Y_1$ &  $Y_i \leq y(n,k) < Y_{i+1}$ &  $y(n,k) = Y_{N+1}$ &
$b_0 \leq x(n,k) < b_1(k)$   $b_i(k) \leq x(n,k) < b_{i+1}(k)$   $b_{N+1}(k) \leq x(n,k) \leq b_{N+2}$

Fig. 6

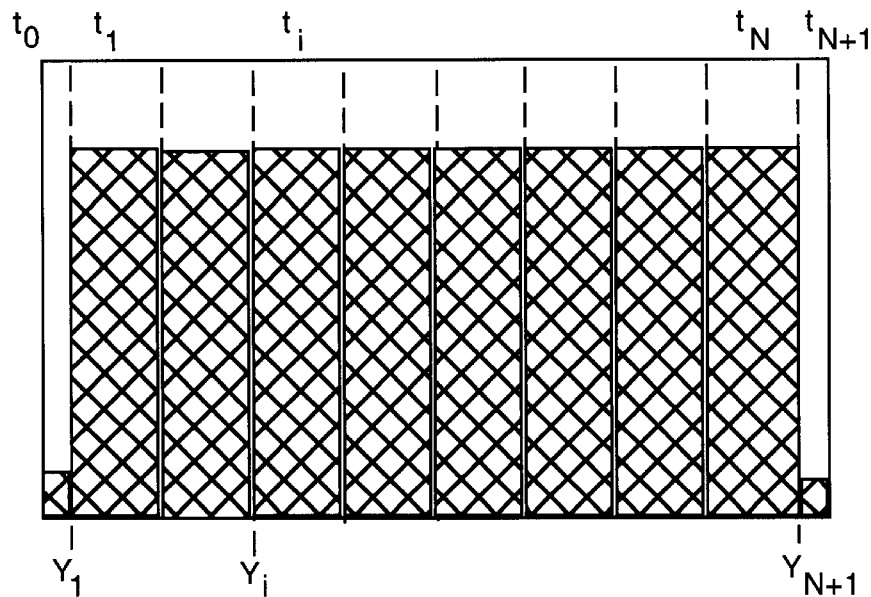

Fig. 8

```
                                                                    50
                                                                     ↓
┌─────────────────────────────────────────────────────────────────┐
│ A DIGITAL INPUT SIGNAL IS PROCESSED BY A PIECEWISE-LINEAR       │─51
│ TRANSFER FUNCTION TO PRODUCE A DIGITAL OUTPUT SIGNAL            │
└─────────────────────────────────────────────────────────────────┘
                                  ↓
┌─────────────────────────────────────────────────────────────────┐
│ A COARSE HISTOGRAM OF THE OUTPUT SIGNAL IS COLLECTED,           │─52
│ WHERE THE NUMBER OF BINS COLLECTED IS EQUAL TO THE              │
│ NUMBER OF PIECEWISE-LINEAR SEGMENTS                             │
└─────────────────────────────────────────────────────────────────┘
                                  ↓
┌─────────────────────────────────────────────────────────────────┐
│ THE BREAKPOINTS AND GAINS OF THE PIECEWISE-LINEAR               │─53
│ TRANSFER FUNCTION ARE UPDATED SUCH THAT, ON THE NEXT            │
│ ITERATION THROUGH THE PROCESSING LOOP, THE COARSE               │
│ HISTOGRAM IS DRIVEN TOWARDS THE TARGET HISTOGRAM                │
└─────────────────────────────────────────────────────────────────┘
```

CLOSED LOOP PIECEWISE-LINEAR HISTOGRAM SPECIFICATION METHOD AND APPARATUS

This invention was made with Government support under Contract No. F04701-97-C-0019 awarded by the U.S. Department of the Air Force. The Government has certain rights in this invention.

BACKGROUND

The present invention relates generally to histogram specification systems and methods, and more particularly, to systems and methods that implement closed loop piecewise-linear histogram specification processing.

A primary signal processing function carried out by forward looking infrared (FLIR) video processing electronics is output processing that converts between a high dynamic-range internal representation of the video signal and a lower dynamic-range representation suitable for display on a monochrome monitor. The goal of such an output processor is to optimize the image contrast on a frame-by-frame basis while retaining as much of the original information content as possible. Typically, a histogram of the internal video signal is collected by the signal processor in static random access memory (RAM). The system controller reads this histogram from the signal processor after each video frame in order to create an output lookup-table that converts between the high dynamic-range and low dynamic-range signal representations.

Several histogram equalization algorithms (which result in output video with a uniform distribution function), and histogram specification algorithms (which result in output video with a specified, but not necessarily uniform, distribution function) have been implemented in the FLIR systems developed by the assignee of the present invention. Smaller scale and lower power FLIR systems currently in development by the assignee of the present invention, however, are limited in their output processing capabilities, primarily because conventional histogram equalization and specification techniques impose unacceptably high communication bandwidth and computational-load requirements on the system controller. Systems that use 8-bit microcontrollers and field programmable gate arrays in order to reduce power, board space and cost, currently use linear output processing with automatic gain control rather than histogram-based techniques. As a result, the output video generated by these systems lack fine detail associated with higher-end systems. The present invention results in significantly improved visual imagery and information content on low-power compact systems, by enabling histogram-based output processing in systems with limited computational power and communication bandwidth.

Prior art relating to the present invention includes U.S. Pat No. 3,983,320 entitled "Raster Display Histogram Equalization", U.S. Pat No. 4,353,092 entitled "Real Time Histogram Modification System", and U.S. Pat No. 4,445,138 entitled "Real-Time Dynamic Range Compression for Image Enhancement".

The closest prior art is disclosed in U.S. Pat. No. 4,353,092. A real-time system is described in this patent, in which a lookup-table is used as a "quantizer" to convert between a high dynamic-range input signal and a low dynamic-range output signal. A complete histogram of the output signal is collected in RAM and compared to a specified histogram. The lookup table is then reloaded with new values such that, on the next iteration, the output histogram will be closer to the specified histogram.

The present invention improves upon that disclosed in U.S. Pat. No. 4,353,092 in several key respects. Most significantly, U.S. Pat. No. 4,353,092 requires a means for collecting a complete (i.e., non-coarse) output histogram. The compact low-power systems targeted by the present invention do not have the board space or power budget to accommodate such a collection, nor do these systems have the communication bandwidth required to transfer all of this data to a system controller. U.S. Pat. No. 4,353,092 teaches the use of a lookup-table to implement the transfer function, as opposed to a piecewise-linear approach used in the present invention. In the present invention, the piecewise-linear transfer function is intricately coupled with the coarse histogram collection, in that each piecewise-linear segment corresponds to one of the coarse histogram bins. This coupling is key to the reduction in computational load and communications bandwidth achieved in the present invention.

A piecewise-linear approach to contrast enhancement is presently used in one high-end system developed by the assignee of the present invention. However, in this system, a complete histogram of the input data is required to compute the piecewise-linear breakpoints. In the present invention, collection of the input histogram is eliminated through the use of a closed-loop algorithm based on a coarse collection of the output histogram. The compact low-power systems targeted by the present invention do not have the computational power or communication bandwidth required to implement the method used in this system.

It would therefore be desirable to have systems and methods that implement closed loop piecewise-linear histogram specification that improves upon conventional processing systems and methods of contrast enhancement and dynamic range conversion.

SUMMARY OF THE INVENTION

The present invention provides for systems and methods for computing and applying a real-time transformation between digital input and output signals for the purpose of output histogram specification. The systems and methods utilize a piecewise-linear transfer function, coarse output histogram collection, and a closed-loop algorithm to achieve a target (or specified) coarse histogram. The use of a piecewise-linear transfer function in conjunction with coarse output histogram collection, where the number of bins collected is equal to the number of piecewise-linear segments, results in a significant reduction in computational load and communication bandwidth in comparison to conventional histogram specification methods. The present invention enables compact low-power implementations that contain a system controller to implement the closed-loop algorithm, and a signal processor to implement the piecewise-linear transfer function and coarse output histogram collection.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which:

FIG. 6 illustrates an exemplary target output histogram;

FIG. 8 illustrates an exemplary method in accordance with the principles of the present invention.

DETAILED DESCRIPTION

Figure 1:
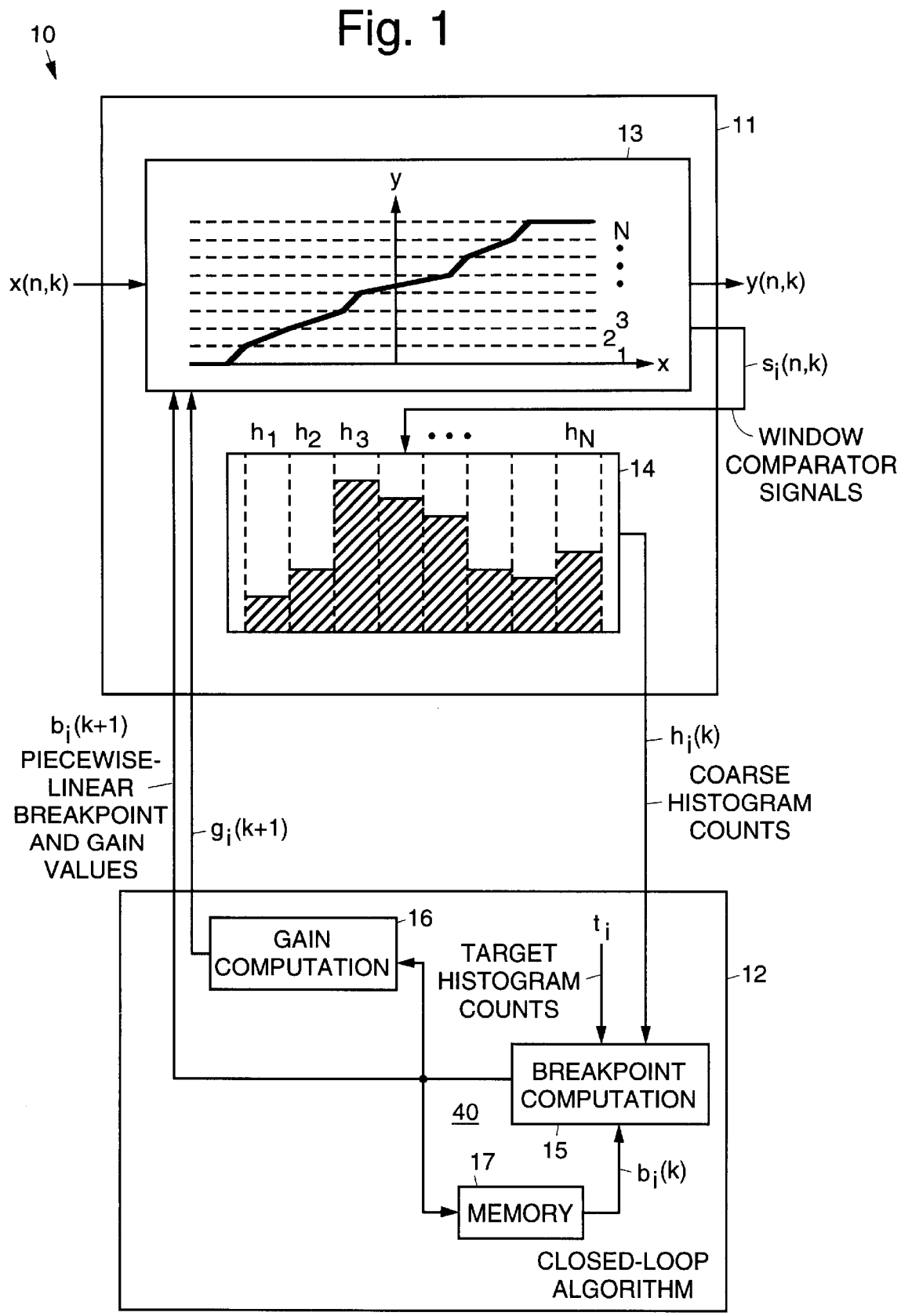
FIG. 1 illustrates an exemplary system in accordance with the principles of the present invention.

Referring to the drawing figures, FIG. 1 illustrates an exemplary system 10 in accordance with the principles of the present invention that computes and applies a real-time transformation between digital input and output signals for the purpose of implementing output histogram specification. The system 10 comprises a signal processor 11 and a controller 12 coupled together in a closed loop.

The signal processor 11 applies a piecewise-linear transformation 13 to an input signal and generates an output signal. The output signal typically has a lower dynamic-range representation than the input signal, although any desired dynamic-range representation may be generated. The signal processor 11 collects a coarse histogram 14 of the output signal, where the number of coarse histogram bins collected is equal to the number of piecewise-linear segments used in the transformation 13. Histogram counts generated by the coarse histogram collection 14 are input to the controller 12.

The controller 12 implements a closed-loop algorithm 40 that drives the histogram counts collected by the signal processor 11 towards a target (or specified) coarse histogram. The closed-loop algorithm 40 processes target histogram counts, current histogram counts, and current breakpoint values to generate new breakpoint values that are used by the piecewise-linear transfer function 13. The new breakpoint values are stored in a memory 17. New gain values are computed 16 using the new breakpoint values.

The use of a piecewise-linear transfer function 13 in conjunction with the present coarse histogram collection 14 results in a significant reduction in computational load and communication bandwidth compared to conventional histogram specification systems and methods. The use of the principles of the present invention thus permits the development of compact low-power systems 10 that contain the controller 12 to implement the closed-loop algorithm 40, and the signal processor 11 to implement the piecewise-linear transfer function 13 and coarse histogram collection 14.

Figure 2:
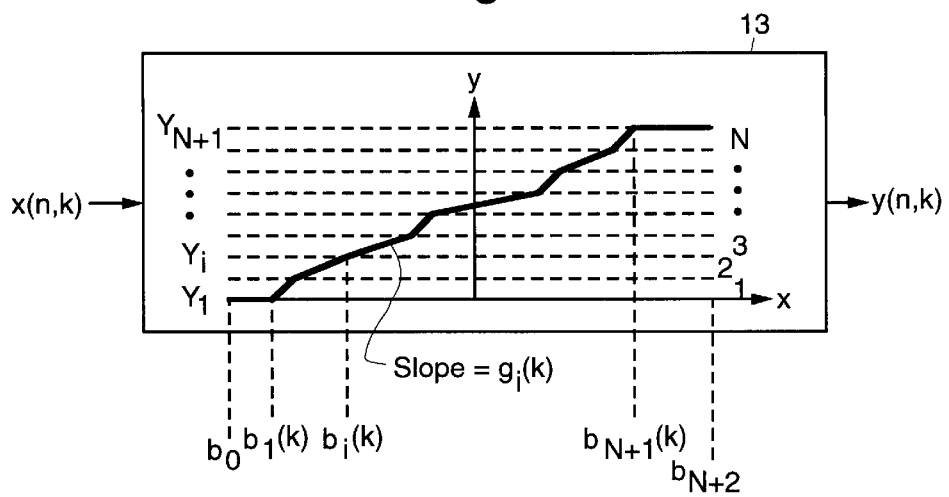
FIG. 2 illustrates details of an exemplary piecewise-linear transfer function used in the system of FIG. 1.

FIG. 2 illustrates details of an exemplary piecewise-linear transfer function 13 used in the system 10 of FIG. 1. The exemplary piecewise-linear transfer function 13 processes an input signal $x(n,k)$, where k is the frame index and n is a time step within the frame, to produce an output signal $y(n,k)$. Several breakpoint values $b_i(k)$ are shown. The slope of the transfer function between breakpoints is given by gain $g_i(k)$, where $$g_i(k)=(Y_{i+1}-Y_i)/(b_{i+1}(k)-b_i(k)), \ 1\leq i \leq N,$$

and $Y_i$ is the output level associated with breakpoint $b_i(k)$. The minimum and maximum possible values of input signal $x(n,k)$ are defined to be $b_0$ and $b_{N+2}$, respectively. The transfer function slope is equal to zero when either $x(n,k)<b_1(k)$ or $x(n,k)\geq b_{N+1}(k)$.

Figure 3:
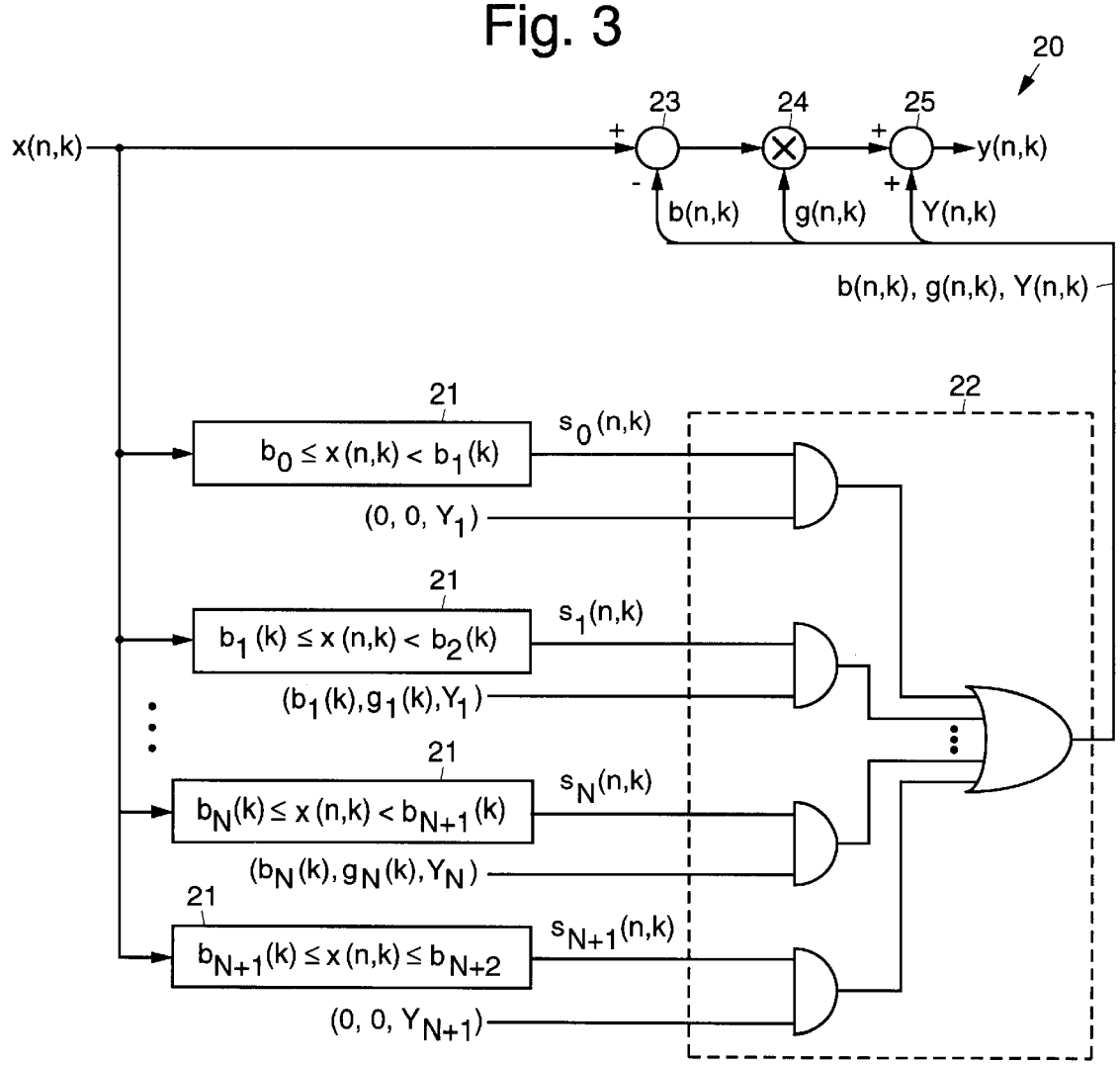
FIG. 3 illustrates logic used to implement the piecewise-linear transfer function shown in FIG. 2.

FIG. 3 illustrates logic 20 used to implement the piecewise-linear transfer function 13 shown in FIG. 2. The logic 20 includes window comparators 21 and a plurality of logic gates 22 interconnected as shown. A subtractor 23, a multiplier 24 and an adder 25 are used to combine signals output by the plurality of logic gates 22 with the input signal $x(n,k)$ to generate the output signal $y(n,k)$. The window comparators 21 determine the pair of adjacent breakpoints between which the input signal $x(n,k)$ currently falls. The plurality of logic gates use window comparator output signals $s_i(n,k)$ to route the appropriate breakpoint $b(n,k)$, gain $g(n,k)$, and output level $Y(n,k)$ signals to the subtractor 23, multiplier 24, and adder 25, respectively.

Figure 4:
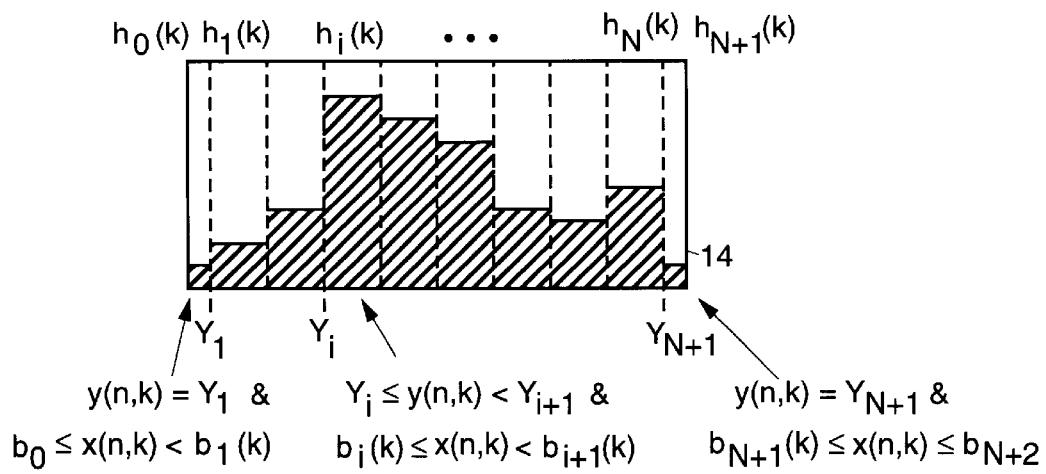
FIG. 4 illustrates coarse output histogram collection used in the system of FIG. 1.

FIG. 4 illustrates a representative coarse output histogram collection 14 performed in the system 10 of FIG. 1. Each histogram count $h_i(k)$ represents the number of times the output signal falls between the range $Y_i \leq y(n,k) < Y_{i+1}$ during frame k. Equivalently, $h_i(k)$ counts the number of times the input signal falls between the range $b_i(k) \leq x(n,k) < b_{i+1}(k)$ during frame k. The left-most histogram count $h_0(k)$ and right-most histogram count $h_{N+1}(k)$ correspond to the number of times the output signal is saturated low $(y(n,k)=Y_1)$ and high $(y(n,k)=Y_{N+1})$, respectively, during frame k.

FIGS. 1, 2 and 4 illustrate equally spaced $Y_i$ values, but there is nothing in the signal processing or closed-loop algorithm 40 used in the present invention that requires this constraint. There may be applications where unequally spaced $Y_i$ values are preferable. For example, one may want more resolution in the specification of the right-hand side of the coarse histogram than the left-hand side, which would imply more closely spaced $Y_i$ values for increasing i.

Figure 5:
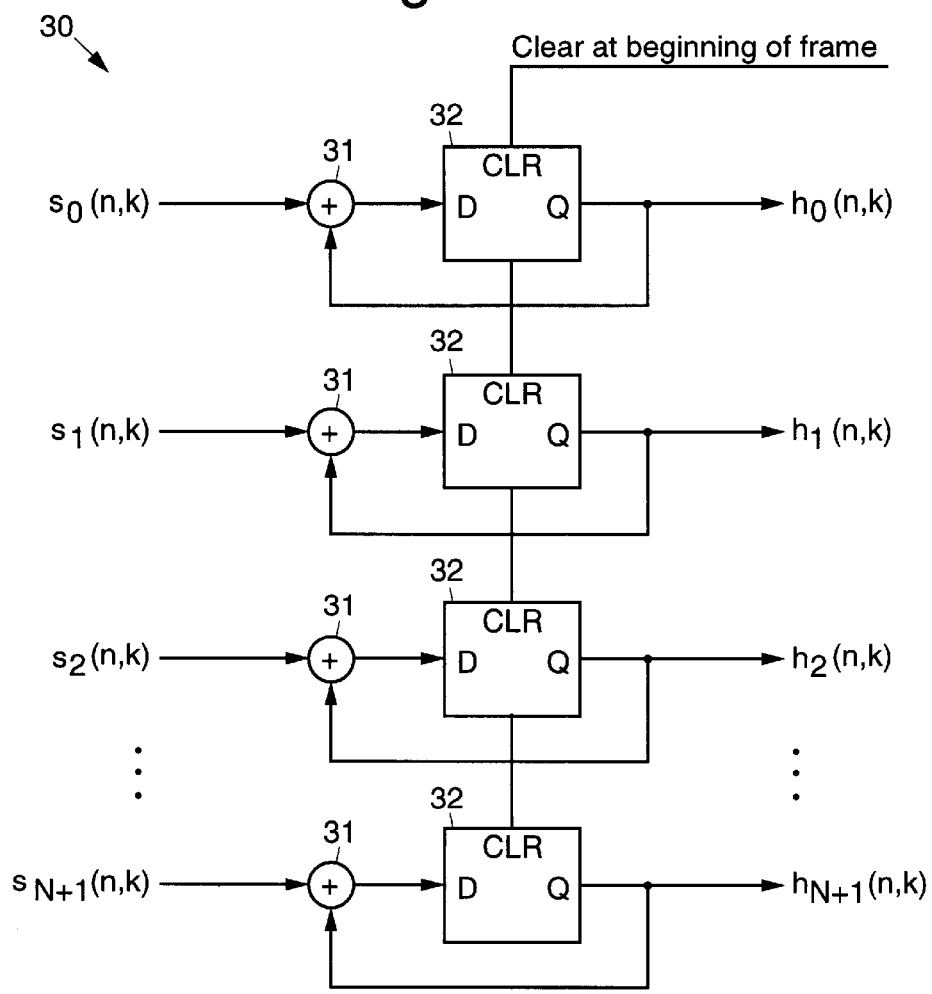
FIG. 5 illustrates logic used to implement the coarse output histogram collection shown in FIG. 4.

FIG. 5 illustrates logic 30 used to implement the coarse output histogram collection 14 shown in FIG. 4. The coarse output histogram collection logic 30 comprises a plurality of adders 31 that process window comparator signals $s_i(n,k)$ that are coupled to a respective plurality of registers 32. The window comparator signals $s_i(n,k)$ are generated by the window comparators 21 used in the piecewise-linear transfer function 13 implementation shown in FIG. 3. These (binary) signals $s_i(n,k)$ are coupled to respective first inputs of the plurality of adders 31 while the respective outputs of the plurality of registers 32 are coupled to respective second inputs of the plurality of adders 31. A clear signal is applied to a clear input (CLR) of each of the plurality of registers 32 at the beginning of each frame. Thus, each register 32 counts how many times its respective window comparator signal $s_i(n,k)$ is equal to 1 during frame k.

FIGS. 3 and 5 illustrate custom hardware-based implementations of the piecewise-linear transfer function 13 and coarse output histogram collection 14 used in the signal processor 11. For instance, these signal processing functions may be implemented in a field programmable gate array or application specific integrated circuit. However, it is to be understood that the equivalent signal processing functions could also be implemented with software running on a programmable digital signal processor (DSP) chip or general purpose microprocessor, provided that the DSP chip or microprocessor is able to execute the required signal processing software in real time.

The system controller 12 processes the coarse output histogram counts $h_i(k)$, target histogram counts $t_i$ and current breakpoint values $b_i(k)$ to compute new breakpoint values $b_i(k+1)$. The controller 12 updates the breakpoint values such that the output histogram counts $h_i(k)$ are driven towards the target histogram counts $t_i$. An exemplary set of target histogram counts $t_i$ is shown in FIG. 6. This figure illustrates the special case of histogram equalization, in which the target counts for all output histogram bins are equal. The left-most target count $t_0(k)$ and right-most target count $t_{N+1}(k)$ are distinguished from the others because they correspond to the number of times the output signal y(n,k) should be saturated low and high, respectively.

Figure 7:
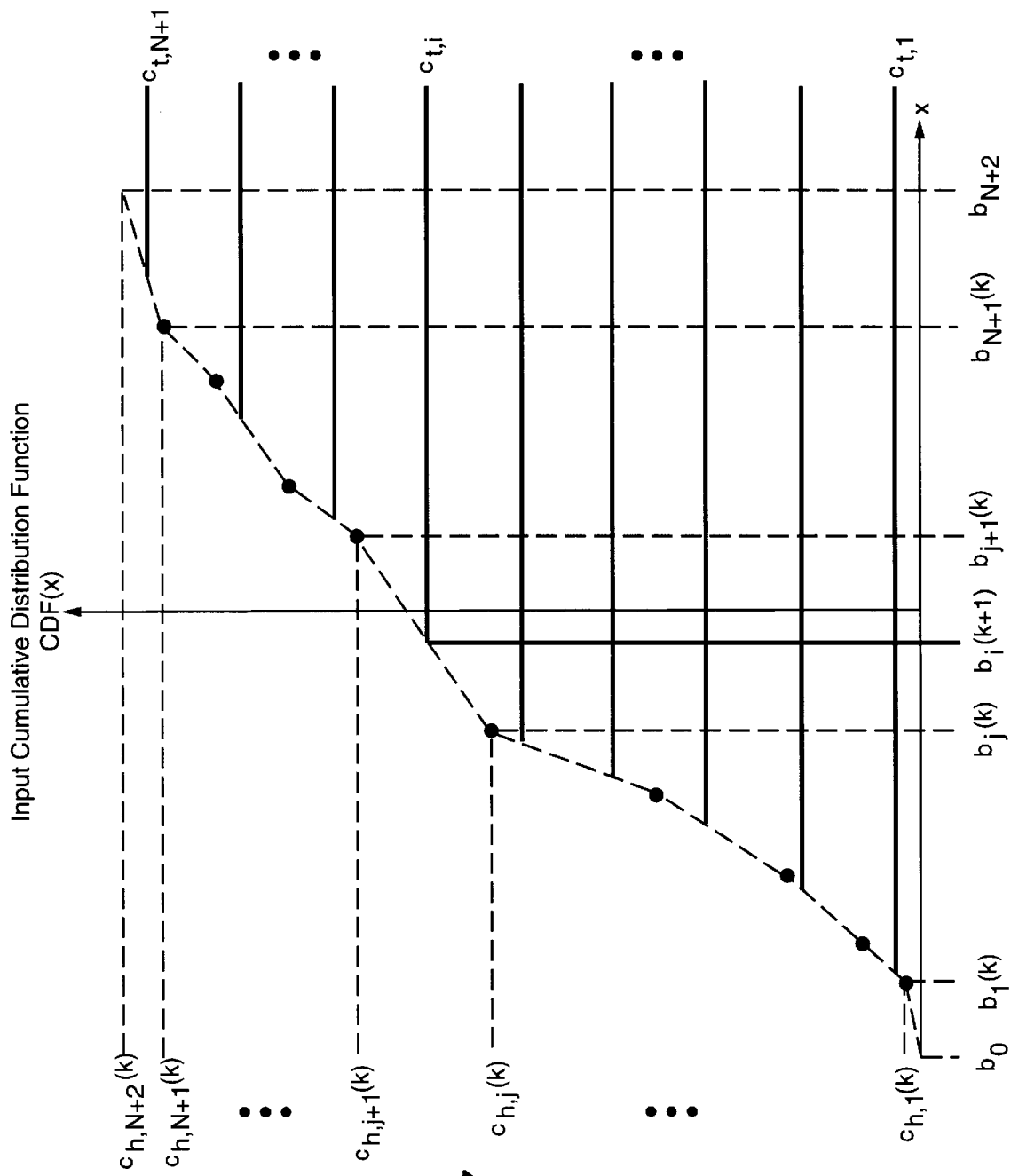
FIG. 7 illustrates an exemplary input cumulative distribution function and the determination of new piecewise-linear transfer function breakpoint values.

The closed loop histogram specification algorithm 40 will now be described with reference to FIGS. 7 and 8.

The first step in the algorithm 40 is to compute 15 the sum of histogram counts $h_i(k)$ to generate cumulative histogram counts $c_{h,i}(k)$ according to $$c_{h,i}(k) = \sum_{m=0}^{i-1} h_m(k), 1 \le i \le N+2.$$

For notational convenience, an additional cumulative histogram count $c_{h,0}(k)$ is defined such that $c_{h,0}(k)=0$. The value $c_{h,i}(k)$ is equal to the number of times the input signal $x(n,k)<b_i(k)$ during frame k. Similarly, target histogram counts $t_i$ are summed to generate target cumulative histogram counts $c_{t,i}$ according to $$c_{t,i} = \sum_{m=0}^{i-1} t_m, 1 \le i \le N+1.$$

The value $c_{t,i}$ is equal to the target for the number of times input signal $x(n,k)<b_i(k)$ during any frame k. The target cumulative histogram counts should be computed only once because they are constant over the course of the algorithm 40.

The second step in the algorithm 40 is to use the cumulative histogram counts and current breakpoint values to estimate the cumulative distribution function of the input signal x(n,k). This estimated cumulative distribution function is then used to determine new breakpoint values. FIG. 7 illustrates an exemplary input cumulative distribution function, where linear interpolation is shown between breakpoints. The interpolated cumulative distribution function is used to compute new piecewise-linear transfer function breakpoint values as follows. For each target cumulative histogram count $c_{t,i}$, a bounding pair of cumulative histogram counts is found such that $c_{h,j}(k) \le c_{t,i} < c_{h,j+1}(k)$. The new breakpoint $b_i(k+1)$ is then determined according to $$b_i(k+1)=[(c_{h,j+1}(k)-c_{t,i})b_j(k)+(c_{t,i}-c_{h,j}(k))b_{j+1}(k)]/(c_{h,j+1}(k)-c_{h,j}(k)).$$

The equation above corresponds to linear interpolation, although other interpolation methods and corresponding equations may readily be employed by those skilled in the art.

The third step in the algorithm 40 is to use the new breakpoint values to compute 16 new gain values according to $$g_i(k+1)=(Y_i+1-Y_i)/(b_{i+1}(k+1)-b_i(k+1)).$$

The algorithm described above inherently relies on the assumption that the histogram of input signal x(n,k) changes slowly enough over frame index k such that the iterative breakpoint and gain updates can effectively track these changes. This assumption is generally true in video processing systems, for instance, where scene changes are typically much slower than the 30 frames/sec update rate. It should also be noted that the breakpoints and gains need not be updated at every frame k. If the histogram counts $h_i(k)$ are sufficiently close to the target histogram counts $t_i$ (as judged by a squared error metric, for instance) at a given frame k, holding the breakpoints and gains constant may prevent unwanted oscillations in the piecewise-linear transfer function and output signal y(n,k).

Referring now to FIG. 8, it illustrates an exemplary method 50 in accordance with the principles of the present invention that produces a real-time transformation between digital input and output signals for the purpose of implementing output histogram specification. The method 50 comprises the following steps.

A digital input signal is processed by a piecewise-linear transfer function to produce a digital output signal. A coarse histogram of the output signal is collected, where the number of bins collected is equal to the number of piecewise-linear segments. The breakpoints and gains of the piecewise-linear transfer function are updated such that, on the next iteration through the processing loop, the coarse histogram is driven towards the target histogram.

Thus, closed loop piecewise-linear histogram specification systems and methods have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A real-time system for converting a digital input signal into a digital output signal having a specified coarse histogram, comprising:

a signal processor that transforms the digital input signal into a digital output signal using a predetermined transfer function with a set of breakpoint and gain values, and which signal processor collects a coarse histogram of the generated output signal, wherein the predetermined transfer function comprises a piecewise-linear transfer function which is implemented using logic comprising a plurality of window comparators and a plurality of logic gates coupled to the plurality of window comparators, and a serially coupled subtractor, multiplier, and adder for combining signals output by the plurality of logic gates with the input signal, to generate an output signal having the specified coarse histogram; and a controller coupled to the signal processor that computes new breakpoint and gain values using a closed-loop algorithm, such that the collected coarse histogram is driven towards the specified coarse histogram.

2. The system recited in claim 1 wherein said new breakpoint values are computed based on the breakpoint values, the current coarse histogram, and the specified coarse histogram.

3. The system recited in claim 1 wherein the gain values are computed using the new breakpoint values.

4. The system recited in claim 1 wherein the new breakpoint values are stored in a memory.

5. The system recited in claim 1 wherein the coarse histogram is generated such that the number of histogram bins that are collected is equal to the number of piecewise-linear segments.

6. The system recited in claim 1 wherein the piecewise-linear transfer function is implemented in software that executes in real time on the signal processor.

7. The system recited in claim 1 wherein the closed-loop algorithm is implemented in software running on the controller.

8. The system recited in claim 1 wherein the coarse histogram is collected using coarse histogram collection logic that comprises a plurality of adders coupled to a plurality of registers.

9. The system recited in claim 1 wherein the coarse histogram is collected in software that executes in real time on the signal processor.

10. The system recited in claim 1 wherein the closed loop algorithm computes the sum of histogram counts to generate cumulative histogram counts, estimates the cumulative distribution function of the input signal to determine new piecewise-linear transfer function breakpoint values, and computes new gain values using the new breakpoint values.

\* \* \* \* \*